United States Patent Office 2,875,229
Patented Feb. 24, 1959

2,875,229

PREPARATION OF NEUTRAL MIXED PHOSPHATES FROM TRIALKYL PHOSPHATES AND CARBOXYLIC ACID ESTERS

Harry W. Coover, Jr., and Richard L. McConnell, Kingsport, Tenn., assignors to Eastman Kodak Company, Rochester, N. Y., a corporation of New Jersey No Drawing. Application February 14, 1956
Serial No. 565,300

6 Claims. (Cl. 260—461)

This invention relates to a process for the preparation of neutral mixed phosphates. In a specific aspect this invention relates to a process for preparing neutral mixed phosphates having the structural formula:

[RX][R'X][R'X]P=X wherein R and R' are radicals selected from the group consisting of alkyl, substituted alkyl, aryl and substituted aryl and wherein X is either oxygen or sulfur.

Neutral mixed phosphates have been prepared by various prior art procedures. For example, such phosphates have been prepared by the reaction of a primary alcohol with phosphorus oxychloride and the resulting phosphoryl dichloride is reacted with sodium phenoxide. Also such phosphates have been prepared by reacting a trialkyl phosphate with an alkyl chlorosulfinate or chloroformate. Another procedure involves the reaction of a chlorophosphate with an alcohol, a phenol or an alkali metal alkoxide. Each of the procedures suffers from some disadvantage. For example, the latter procedure requires the preparation of the chlorophosphate intermediate, which must be isolated and when the chlorophosphate is reacted with an alcohol, a tertiary organic base is required to remove the liberated hydrogen chloride. The only alternative is to react an alkali metal alkoxide with the chlorophosphate, but the yields from this procedure are poor due to competing reactions.

In accordance with this invention, it has been found that neutral mixed phosphates can be produced economically in excellent yields by reacting a phosphate selected from the group consisting of trialkyl phosphates and trialkyl thiophosphates wherein the alkyl radicals contain up to 8 carbon atoms per alkyl radical, with a lower carboxylic acid ester. The products of this invention have the structural formula:

[RX][R'X][R'X]P=X wherein R and R' are radicals selected from the group consisting of alkyl containing up to 8 carbon atoms, such as methyl, ethyl, butyl, octyl and the like, haloalkyl, containing up to 8 carbon atoms, such as chloropropyl, bromobutyl, and the like, and aryl and substituted aryl, such as phenyl, cresyl, chlorophenyl, nitrophenyl, and the like. In these products R and R' are different and at least one of R and R' is an alkyl radical. X is either oxygen or sulfur. In the reaction, the trialkyl phosphate is reacted with an ester having the structural formula:

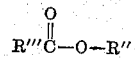

In this carboxylic acid ester, R" is the same as R and R' but different from the alkyl radicals in the trialkyl phosphate or thiophosphate reactant. R''' is a lower alkyl radical such as methyl, ethyl, propyl, butyl and the like. When triethyl phosphate is reacted with butyl acetate in accordance with this invention, the reaction can be expressed by the following equation:

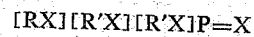

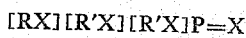

The reaction is carried out for a period of 1 to 24 hours and at a temperature of 100 to 275° C. The preferred temperature range is from 125 to 240° C. for a period of time ranging from 4 to 16 hours depending upon the reactants employed. When no catalyst is used in the reaction, temperatures in excess of 200° C., for example about 250° C., are employed. The reaction can, however, be carried out in the presence of a catalyst and when a catalyst is used, substantially lower temperatures are suitable. For example, when a lead oxide catalyst such as litharge is used, a temperature of about 130° C. is satisfactory. When a catalyst is used in the reaction, an amount within the range of 0.5 to 5% by weight and higher is usually employed.

Varying the reactants has an effect upon the mixed phosphate esters produced in the reaction. For example, in the reaction of butyl acetate with triethyl phosphate, an excess of the butyl acetate results in the production of dibutyl ethyl phospate. It is actually preferable to use an excess of the carboxylic acid ester since the excess accelerates the reaction and produces better yields of the mixed phosphates. However, equimolar proportions of the reactants can be used and, if desired, an excess of the trialkyl phosphate can be employed.

The products of this invention are useful as plasticizers, solvents, pesticides, synthetic lubricants and intermediates for the preparation of other organophosphorus compounds. Cellulose esters plasticized with these mixed phosphates are self-extinguishing.

The following examples wherein the parts are in parts-by-weight illustrate the invention:

*Example 1.—Mixed butyl ethyl phosphates*

A mixture of 36.4 parts of triethyl phosphate, 139.0 parts of n-butyl acetate and 5.0 parts of yellow plumbous oxide (litharge) was heated under total reflux for 2 hours with a pot temperature of 130° C. Then low boiling materials were removed from the top of the distillation column within the 75–120° C. range for 12–14 hours. This distillate consisted of a mixture of ethyl and butyl acetate. The remainder of the excess butyl acetate was removed by distillation at atmospheric pressure. The reaction mixture was then filtered to remove the catalyst residue and vacuum distilled. After removing 13.4 parts of unreacted triethyl phosphate, 16.1 parts of butyl diethyl phosphate (B. P. 84–89° C. at 2.5 mm.) and 7.0 parts of dibutyl ethyl phosphate (B. P. 95–98° C. at 2.5 mm.) were collected. It is unnecessary to fractionate the two phosphates and the entire product boiling within the range 84–98° C. at 2.5 mm. can be used since this mixture makes an excellent plasticizer for cellulose esters. This mixture of butyl ethyl phosphates can be used alone or in combination with other conventional plasticizers to give any desired flow. Cellulose esters containing 15–20 parts of this mixture of phosphates are self-extinguishing.

*Example 2.—Mixed methyl octyl phosphates*

A mixture of 28.0 parts of trimethyl phosphate, 206.0 parts of octyl acetate and 5.0 parts of litharge was reacted according to the procedure in Example 1 to give a mixture of dimethyl octyl and dioctyl methyl phosphate.

*Example 3.—Mixed ethyl phenyl phosphates*

A mixture of 36.4 parts of triethyl phosphate, 164.0 parts of phenyl acetate and 3.0 parts of litharge was reacted according to the procedure in Example 1 to produce a mixture of diethyl phenyl and diphenyl ethyl phosphate.

*Example 4.—Mixed ethyl o-nitrophenyl thiophosphates*

A mixture of 39.6 parts of triethyl thiophosphate, 181.1 parts of o-nitrophenyl acetate and 5.0 parts of litharge was reacted according to the procedure in Example 1. After removing excess o-nitrophenyl acetate and a small amount of unreacted triethyl thiophosphate, the residue consisted mainly of diethyl o-nitrophenyl thiophosphate. This crude reaction product without further purification is a valuable pesticide.

*Example 5.—Mixed ethyl isobutyl thiophosphates*

A mixture of 46.0 parts of triethyl phosphorotrithioate $[(C_2H_5S)_3P=O]$, 139.0 parts of isobutyl acetate, and 4.0 parts of litharge was reacted according to the procedure in Example 1 to produce a mixture of diethyl isobutyl and diisobutyl ethyl thiophosphates.

*Example 6.—Mixed butyl ethyl phosphates*

A mixture of 36.4 parts of triethyl phosphate and 139.0 parts of n-butyl acetate was placed in a rocking autoclave and heated at 250° C. for 8 hours. Fractionation of the reaction mixture after removal of ethyl and butyl acetate gave the following fractions:

| Cut | Boiling point, °C. | $n_D^{20}$ | Yield in parts |
|---|---|---|---|
| 1 | 75–87 (3.0 mm.) | | 3.7 |
| 2 | 85–108 (2.8–3.0 mm.) | 1.4147 | 21.0 |
| 3 | Distillation residue | | 10.0 |

Cut 2 contained butyl diethyl phosphate and dibutyl ethyl phosphate.

We claim:
1. The process of preparing neutral mixed phosphates and thiophosphates having the structural formula:

[RX][R'X][R'X]P=X wherein R and R' are radicals selected from the group consisting of alkyl, containing up to 8 carbon atoms, haloalkyl, containing up to 8 carbon atoms, phenyl and nitrophenyl, said R and R' being different and at least one of said R and R' being alkyl and wherein X is selected from the group consisting of oxygen and sulfur which comprises reacting a trialkyl phosphate wherein the alkyl radicals contain up to 8 carbon atoms per alkyl radical with a lower carboxylic acid ester selected from the group consisting of

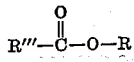

and

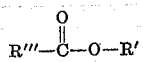

wherein R and R' are defined the same as above and R''' is a lower alkyl radical at a temperature within the range of 100 to 275° C. and in the presence of a lead oxide catalyst.

2. The process for producing neutral mixed phosphates which comprises reacting triethyl phosphate with n-butyl acetate at a temperature within the range of 100 to 275° C. and in the presence of a lead oxide catalyst.

3. The process for producing neutral mixed phosphates which comprises reacting trimethyl phosphate with octyl acetate at a temperature within the range of 100 to 275° C. and in the presence of a lead oxide catalyst.

4. The process for producing neutral mixed phosphates which comprises reacting triethyl phosphate with phenyl acetate at a temperature within the range of 100 to 275° C. and in the presence of a lead oxide catalyst.

5. The process for producing neutral mixed thiophosphates which comprises reacting triethyl thiophosphate with o-nitrophenyl acetate at a temperature within the range of 100 to 275° C. and in the presence of a lead oxide catalyst.

6. The process for producing neutral mixed thiophosphates which comprises reacting triethyl phosphorotrithioate with isobutyl acetate at a temperature within the range of 100 to 275° C. and in the presence of a lead oxide catalyst.

References Cited in the file of this patent

UNITED STATES PATENTS 1,873,513    Van Loon _____ Aug. 23, 1932

OTHER REFERENCES

Ralson: Fatty Acids and Their Derivatives, 1947, p. 544, lines 5–9.

Rueggeberg et al.: J. A. C. S., vol. 70, pp. 1802–1804 (1948).

Kosalopoff: Organo-Phosphorus Compounds, 1950, p. 227, sect. VIII.

Groggins: Unit Processes in Organic Syntheses, 1952, pp. 597–8, 609 and 618–9.